(12) United States Patent
Sato et al.

(10) Patent No.: US 7,512,789 B2
(45) Date of Patent: Mar. 31, 2009

(54) MAILING LIST SERVER AND MAIL TRANSMISSION METHOD THEREOF

(75) Inventors: Mitsuru Sato, Kawasaki (JP); Naoyasu Terao, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 1094 days.

(21) Appl. No.: 10/352,202

(22) Filed: Jan. 28, 2003

(65) Prior Publication Data

US 2003/0188151 A1 Oct. 2, 2003

(30) Foreign Application Priority Data

Mar. 29, 2002 (JP) ............................ P2002-098084

(51) Int. Cl.
  H04L 9/00 (2006.01)
  G06F 15/16 (2006.01)
  H04L 12/54 (2006.01)
  H04L 12/58 (2006.01)
  H04L 9/12 (2006.01)
  H04L 9/14 (2006.01)
  H04L 9/08 (2006.01)
  G06F 13/00 (2006.01)

(52) U.S. Cl. ..................... 713/163; 713/152; 713/168; 709/206

(58) Field of Classification Search .............. 713/163, 713/152; 709/206
See application file for complete search history.

(56) References Cited

U.S. PATENT DOCUMENTS

| 5,341,426 A | 8/1994 | Barney et al. |
| 6,609,196 B1 * | 8/2003 | Dickinson et al. ........... 713/164 |
| 2002/0099941 A1 * | 7/2002 | Tanimoto ..................... 713/168 |

FOREIGN PATENT DOCUMENTS

| JP | A-06-232861 | 8/1994 |
| JP | 2001186120 A * | 7/2001 |
| JP | A-2001-186120 | 7/2001 |
| JP | 2001237872 A * | 8/2001 |
| JP | A-2001-237872 | 8/2001 |
| JP | A-2002-009815 | 1/2002 |

(Continued)

OTHER PUBLICATIONS

English Translation JP 2001237872 A provided on Apr. 22, 2008.*

(Continued)

*Primary Examiner*—Matthew B Smithers
*Assistant Examiner*—Courtney D Fields
(74) *Attorney, Agent, or Firm*—Oliff & Berridge, PLC

(57) ABSTRACT

A mailing list server sends mail encrypted by an encryption method compatible with the mail user agent device likely to receive the mail. A mailing list server 20 receives a signed mail from a member and registers and manages the SMIME-Capabilities of that mail in a members' encryption function map 212. A mail-receiving part 201 verifies the signature on a mail received from a member using the member's certificate and decrypts the mail. A mail-distributing part 202 signs and encrypts mail for distribution and distributes it to members' mail addresses. A symmetric encryption key to be used for the encryption is determined for each member with reference to the members' encryption function map 212.

19 Claims, 5 Drawing Sheets

FOREIGN PATENT DOCUMENTS

WO     WO 02077773 A2 * 10/2002

OTHER PUBLICATIONS

English Translation JP 2001186120 A provided on Apr. 22, 2008.*

Katagishi, K.; Asami, T.; Ebihara, Y.; Sugiyama, T.; Toraichi, K.; "A public key cryptography-based security enhanced mail gateway with the mailing list function", Communications, Computers and Signal Processing, 1999 IEEE Pacific Rim Conference on Aug. 22-24, 1999, pp. 262-265.*

* cited by examiner

FIG. 5

EXAMPLE 1: To: aaa-ML-Control@example.com
. . . .
set mailer
. . . .

EXAMPLE 2:
To: aaa-ML@example.com
. . . .
set mailer
. . . .

FIG. 6

EXAMPLE 1: To: aaa-ML-Control@example.com
. . . .
add mailer
. . . .

EXAMPLE 2:
To: aaa-ML@example.com
. . . .
add mailer
. . . .

FIG. 7 add mailer
delete mailer N
list mailer
　　RETURN VALUES
　　1. AA-Mailer Ver. x.xx 2001/12/10 05:03:07
　　2. BB-Mailer Ver. y.yy 2001/10/1 13:31:18

MAILING LIST SERVER AND MAIL TRANSMISSION METHOD THEREOF

BACKGROUND OF THE INVENTION

This invention relates to mail transmission technology with which it is possible to send an encrypted mail using an encryption method compatible with the mail user agent device likely to be used to receive the mail.

In an S/MIME-encrypted mail, the message body is encrypted with symmetric key encryption. There are many types of symmetric key encryption, and these are variously supported by different mailers (mail user agent devices). When the same mail address is used on different mailers, for example one mailer being used in a home and others outside the home, because of differences in the symmetric key encryption methods supported by the mailers, the situation may arise that mail can be read by one mailer and not by another. Thus it is desirable for S/MIME-encrypted mail to be sent which can be received by any mailer among a plurality of mailers from which the recipient uses the same mail address.

And in a mailing list server (PKI-ML server) using public key infrastructure, when an S/MIME message which has been hybrid-encrypted using a public key of a mailing list is received, a re-encrypted S/MIME message is sent out to all the members of the mailing list. Here, the encryption algorithms and key lengths of public key encryption used by members can be determined by means of members' certificates. However, the symmetric key encryption capabilities of mailers used by different members are diverse. Consequently, when the same symmetric key encryption method is always used with respect to all members, there is the possibility that there will be some members who cannot read an encrypted message.

Thus it is desirable for attributes of encryption methods including symmetric key encryption methods to be managed and for messages to be encrypted by encryption methods compatible with the mailers used by members.

SUMMARY OF THE INVENTION

It is therefore an object of the present invention to provide technology for sending an S/MIME-encrypted mail using an encryption method compatible with the mailer or mailers likely to be used to receive the mail.

First, the principle of the invention will be explained. In one example of the invention, when a signed message is received, an SMIMECapabilities is extracted from the message and automatically recorded in association with the sender. And along with this, the date/time of transmission of the message is also stored. If the same SMIMECapabilities was already associated with that sender, just the date/time of transmission of the message associated with that SMIMECapabilities is updated. When a completely new SMIMECapabilities is included in the message, an association of this SMIMECapabilities and the message date/time with the sender is added.

When an S/MIME-encrypted mail is sent, all SMIME capabilities associated with the recipient are extracted, and encryption of the message body is carried out using the highest-level encryption method among the encryption methods supported by all of those SMIME capabilities.

If there is an X-Mailer included in the message header, the value of the X-Mailer may also be stored in association with the sender, either together with or independently of the SMIMECapabilities. From the X-Mailer description the type of the mail user agent being used is known, and in most cases it is possible to distinguish the encryption method used.

And in PKI-ML, by using SMIMECapabilities or X-Mailer information, it becomes possible to select symmetric key encryption algorithms so that all members can read a message.

The present invention will now be explained further.

In this invention, to achieve the above-mentioned object, constructions set forth in the claims are employed. Here, before the invention is explained in detail, a supplementary explanation of that which is set forth in the claims will be given.

That is, according to a first aspect of the invention, to achieve the above-mentioned object, a mailing list server is provided with a receiving section for receiving a mail including a description of an attribute of an encryption method of the mail user agent used by the sender of the mail, an encryption method attribute storing section for, on the basis of the encryption method attribute description in the received mail, storing the encryption method attribute in association with the origin mail address of the received mail, an encryption method determining section for using an encryption method attribute stored in association with the origin mail address in the encryption method attribute storing section to determine an encryption method to be used when sending a mail to the origin mail address, an encrypting section for encrypting the mail to be sent to the origin mail address on the basis of the determined encryption method, and a sending section for sending the mail encrypted by the encrypting section to the origin mail address.

In this construction, because a description of an attribute of the encryption method of the mail user agent used by the sender is obtained from the received mail and an encryption method for outgoing mail encryption is determined on the basis of this for each sender, encryption can be carried out by a method compatible with the mail user agent of each member of a mailing list. The description of the encryption method attribute is for example an SMIMECapabilities. An SMIME-Capabilities includes plurality sets of symmetric key encryption algorithm and parameters thereof. Also, a description of a mail user agent in an X-Mailer mail header can be used. If for each known mail user agent detailed information on the encryption method of that mail user agent is held, a corresponding encryption method can be determined each time a known mail user agent is specified in an X-Mailer header.

When a plurality of encryption method attributes are registered in association with the same origin mail address, the highest-level encryption method among the encryption methods supported by all of the encryption method attributes is determined as the encryption method for mail encryption.

In this construction, the encryption method attribute storing section may store the date/time of sending of the received mail together with the encryption method attribute it stores in association with the origin mail address.

According to another aspect of the invention, to achieve the above-mentioned object, a mail user agent device is provided with a receiving section for receiving a mail including a description of an attribute of an encryption method of the mail user agent used by the sender of the mail, an encryption method attribute storing section for on the basis of the encryption method attribute description in the received mail, storing the encryption method attribute in association with the origin mail address of the received mail, an encryption method determining section for using an encryption method attribute stored in association with the origin mail address in the encryption method attribute storing section to determine an attribute of an encryption method to be used when sending a mail to the origin mail address, an encrypting section for encrypting the mail to be sent to the origin mail address on the basis of the determined encryption method attribute, and a sending section for sending the mail encrypted by the encrypting section to the origin mail address, and when a plurality of encryption method attributes are registered in association with the same origin mail address, the encryption method determining section determines as the encryption method for mail encryption the highest-level encryption method among the encryption methods supported by all of the encryption method attributes.

In this construction, because a description of an attribute of the encryption method of the mail user agent used by the sender is obtained from the received mail and an encryption method for outgoing mail encryption is determined on the basis of this for each sender, encryption can be carried out by a method compatible with the mail user agent likely to be used to receive the mail.

This invention can not only be realized as a device or system but is also realizable as a method. And parts of such an invention can of course be constituted as software. And naturally the technical scope of the invention also includes software products used for making a computer execute such software.

BRIEF DESCRIPTION OF THE DRAWINGS

FIG. 5 is a view illustrating a command for explicitly specifying a mailer change in the preferred embodiment.

FIG. 6 is a view illustrating a command for explicitly specifying a mailer addition in the preferred embodiment.

FIG. 7 is a view illustrating an alternative example of the above-mentioned commands.

DETAILED DESCRIPTION OF THE PREFERRED EMBODIMENTS

A preferred embodiment of the invention applied to a mailing list server will now be described.

Figure 1:
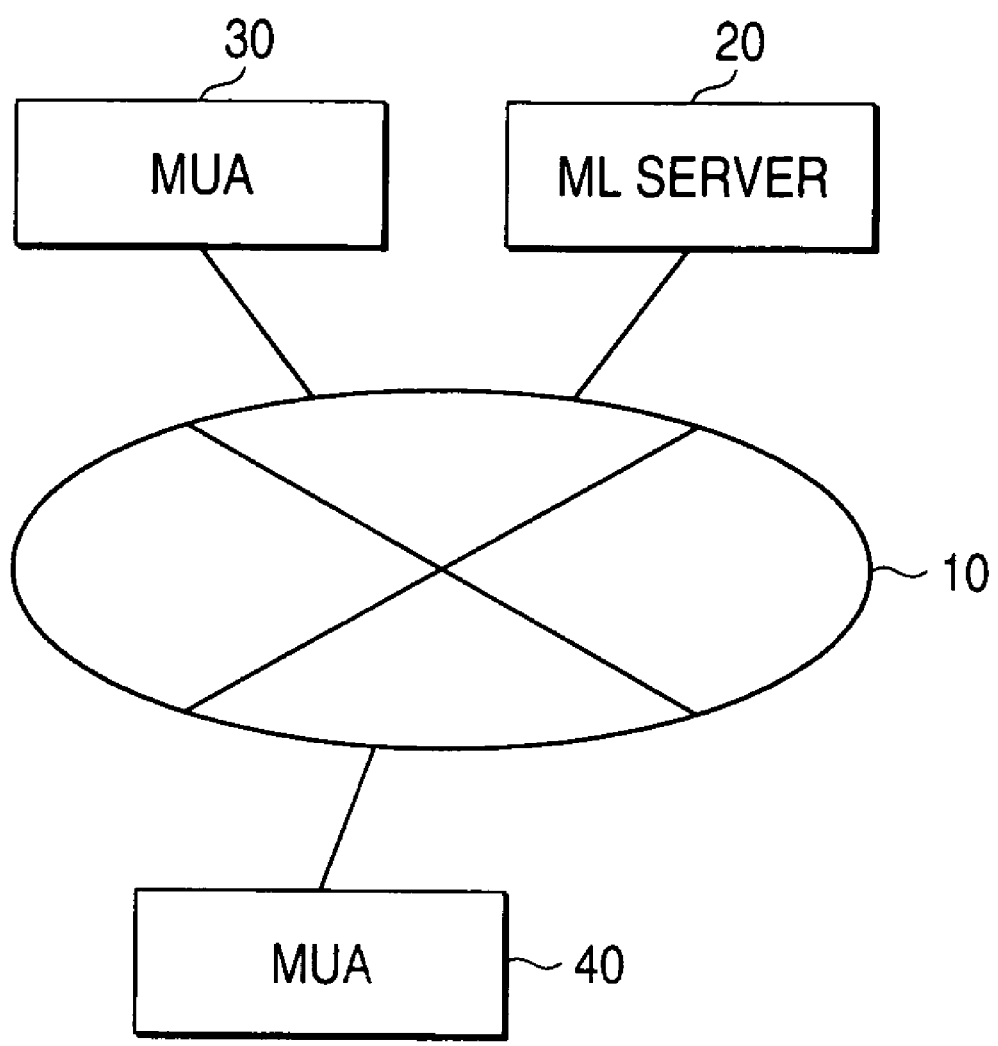
FIG. 1 is a view illustrating a network environment of a preferred embodiment of the invention.

FIG. 1 shows a network environment of this preferred embodiment, and in this figure a mailing list server 20 and mail user agent devices 30, 40 are connected to a network 10. The network 10 is for example the Internet. Although in the figure only two mail user agent devices 30, 40 are shown, of course many mail user agent devices are connected. The mail user agent devices 30, 40 are such that the same user can use the same mail account with either of them. The user uses the encryption function of whichever of the mail user agent devices 30, 40 he/she is using. Therefore, it may happen that a mail can be decrypted with one of the mail user agent devices 30, 40 but not with the other.

The user uses the mail user agent devices 30, 40 to submit encrypted mail to the mailing list server 20. With an MTA (Mail Transfer Agent) receiving function the mailing list server 20 receives encrypted mail sent to it by SMTP (Simple Mail Transfer Protocol) from one of the mail user agent devices 30 and 40, decrypts it and then re-encrypts it and distributes it to the mail addresses of members. This will be discussed in more detail later.

In this preferred embodiment, when a user joins the mailing list, they send a signed mail to the mailing list server 20. And an encryption method of each member is registered using information included in this signed mail. This point will be further discussed later.

Figure 2:
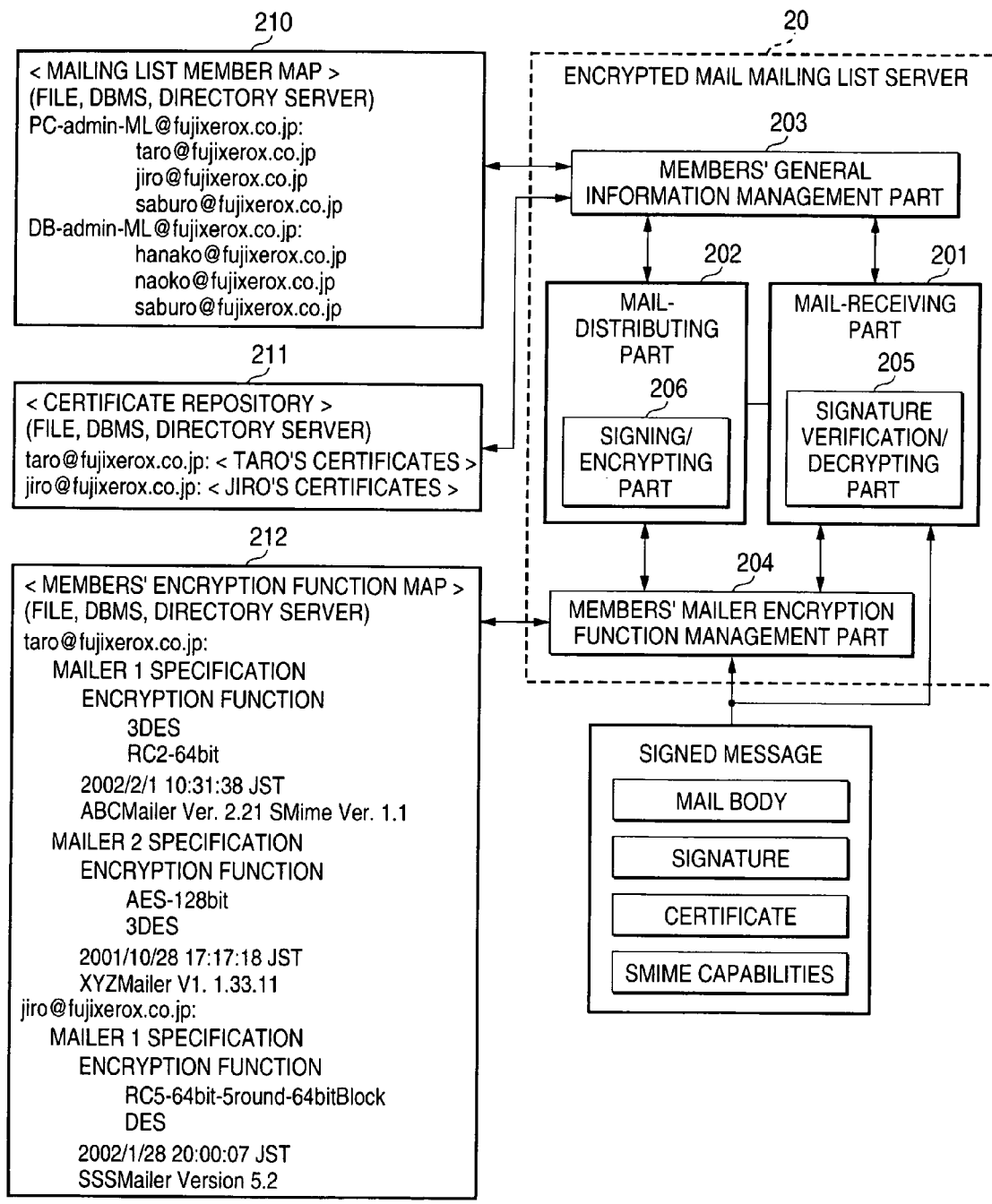
FIG. 2 is a view showing schematically the construction of a mailing list server of this preferred embodiment.

FIG. 2 shows schematically the construction of the mailing list server 20, and as shown in this figure the mailing list server 20 is made up of a mail-receiving part 201, a mail-distributing part 202, a members' general information management part 203, and a members' mailer encryption function management part 204. The mail-receiving part 201 has a signature verification/decrypting part 205. The mail-distributing part 202 has a signing/encrypting part 206.

The members' general information management part 203 manages and refers to a mailing list member map 210 and a certificate repository 211. The members' mailer encryption function management part 204 manages and refers to a members' encryption function map 212. The mailing list member map 210, the certificate repository 211 and the members' encryption function map 212 are managed using for example a file system, a database management system (DBMS) or a directory server.

The mail-receiving part 201 verifies the signature of a received mail from the respective certificate and decrypts the mail. The mail-distributing part 202 signs and encrypts mail to be distributed and distributes it to the mail addresses of the members. A symmetric encryption key to be used for this encryption is determined for each member with reference to the members' encryption function map 212.

Next, registering on the encryption function map, which is carried out on a member's initial registration, will be explained. This processing is carried out as follows.

[Step S1]: The mailing list server 20 transmits a message for confirming mailing list participation to the prospective mailing list member, and in response to this the prospective member replies with a signed message.

[Step S2]: The mailing list server 20 verifies the signature on the reply message. When there is no signature or when verification fails, notification of this is sent to the prospective member (or not), and subsequent processing is suspended. This verification also includes checking a certificate and confirming a match between the mail address in the certificate and the mail address in a 'From' line.

Figure 3:
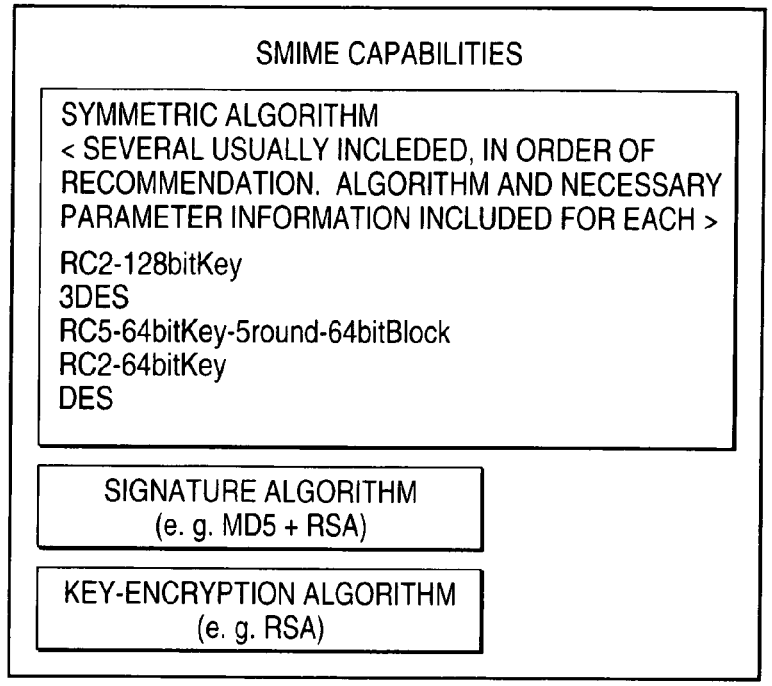
FIG. 3 is a view illustrating an SMIMECapabilities in the preferred embodiment.

[Step S3]: The SMIMECapabilities (hereinafter also called the mailer specification) is stored in the members' encryption function map together with the mail address of the registering member and the date/time of sending of the message. As shown in FIG. 3, the SMIMECapabilities includes information such as symmetric algorithms, signing algorithms and a key-encrypting algorithms.

The latest mailing list servers can perform this procedure easily. That is, modern mailing list servers send a confirmation message to the mail address of the prospective participant so that nobody can maliciously enter someone else onto the mailing list. Only when the prospective participant has replied are they registered onto the mailing list.

Figure 4:
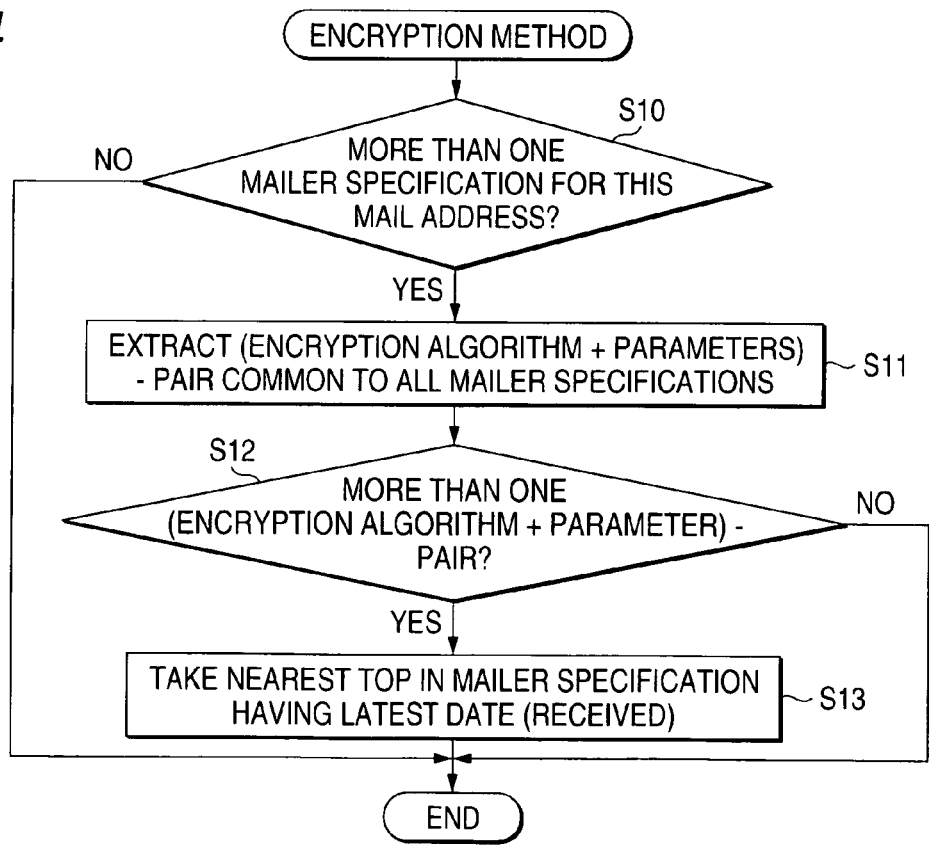
FIG. 4 is a flow chart illustrating the operation of the preferred embodiment.

FIG. 4 shows processing for determining a symmetric key encryption method to be used on an outgoing mail. This processing is as follows.

[Step S10]: It is checked whether or not there are a plurality of mailer specifications corresponding to the destination mail address. When there is only one mailer specification, this is used and the determination processing ends. When there is more than one mailer specification, processing proceeds to Step S11.

[Step S11]: Any pairs of an encryption algorithm and a parameter common to all of the mailer specifications are extracted, and processing proceeds to Step S12.

[Step S12]: It is checked whether or not more than one pair of an encryption algorithm and a parameter has been extracted. If there is only one, that one is used. If there are more than one, processing proceeds to Step S13.

[Step S13]: The pair of an encryption algorithm and a parameter nearest the top in the mailer specification with the latest date is determined as the encryption method.

Alternatively, instead of using the date as a basis, the encryption algorithm and parameter which perform the highest-level encryption can be determined as the encryption method.

Next, processing carried out when a user has changed his/her mailer (SMIMECapabilities) will be described. First, an example wherein a change in mailer is dealt with automatically on the mailing list server 20 side will be described. The processing in this case is as follows.

(1) When a signed message has been transmitted from a destination mail address on the mailing list, the mailing list server 20 compares the currently registered SMIME capabilities of the sender with the SMIMECapabilities in the message.

(2) When one SMIMECapabilities is registered and this is different from the SMIMECapabilities in the message, the registered SMIMECapabilities and date/time are overwritten with the SMIMECapabilities and transmission date/time of the message.

(3) When one SMIMECapabilities is registered and this matches the SMIMECapabilities in the message, the stored date/time is overwritten with the date/time of transmission of the message.

(4) When multiple SMIME capabilities are registered and one of these matches the SMIMECapabilities in the message, the date/time associated with the matching SMIMECapabilities is overwritten with the transmission date/time of the message.

(5) When multiple SMIME capabilities are registered but none of these matches the SMIMECapabilities in the message, the SMIMECapabilities associated with the oldest date/time and that date/time are overwritten with the SMIMECapabilities and transmission date/time of the message.

However, when there is no encryption method common part which is supported by all of the registered SMIME capabilities, or when there are only common encryption methods weaker than a certain level, the registered SMIMECapabilities and date/time pairs are successively deleted, starting with the oldest.

Next, a method whereby a user can explicitly report a change in their encryption method will be described.

The user sends a signed mail including a change command to a control mail address or mailing list destination of the mailing list server 20. An example of this mail is shown in FIG. 5. In this case, for example even if a plurality of SMIME capabilities are registered, after the change only one pair of an SMIMECapabilities and a date/time remain registered.

Next, a method whereby a user can explicitly add an encryption method will be described.

The user sends a signed mail including an add command to a control mail address or mailing list destination of the mailing list server 20. This mail is for example as shown in FIG. 6. In this case, the mailing list server uses an encryption method supported by all of the plurality of registered SMIME capabilities. However, when only encryption methods below a certain level remain, the addition fails.

Commands of the kind shown in FIG. 7 may alternatively be used. In this case, 'list' can be used to receive notification of already registered mailers, and using this a 'delete' can be carried out.

Figure 8:
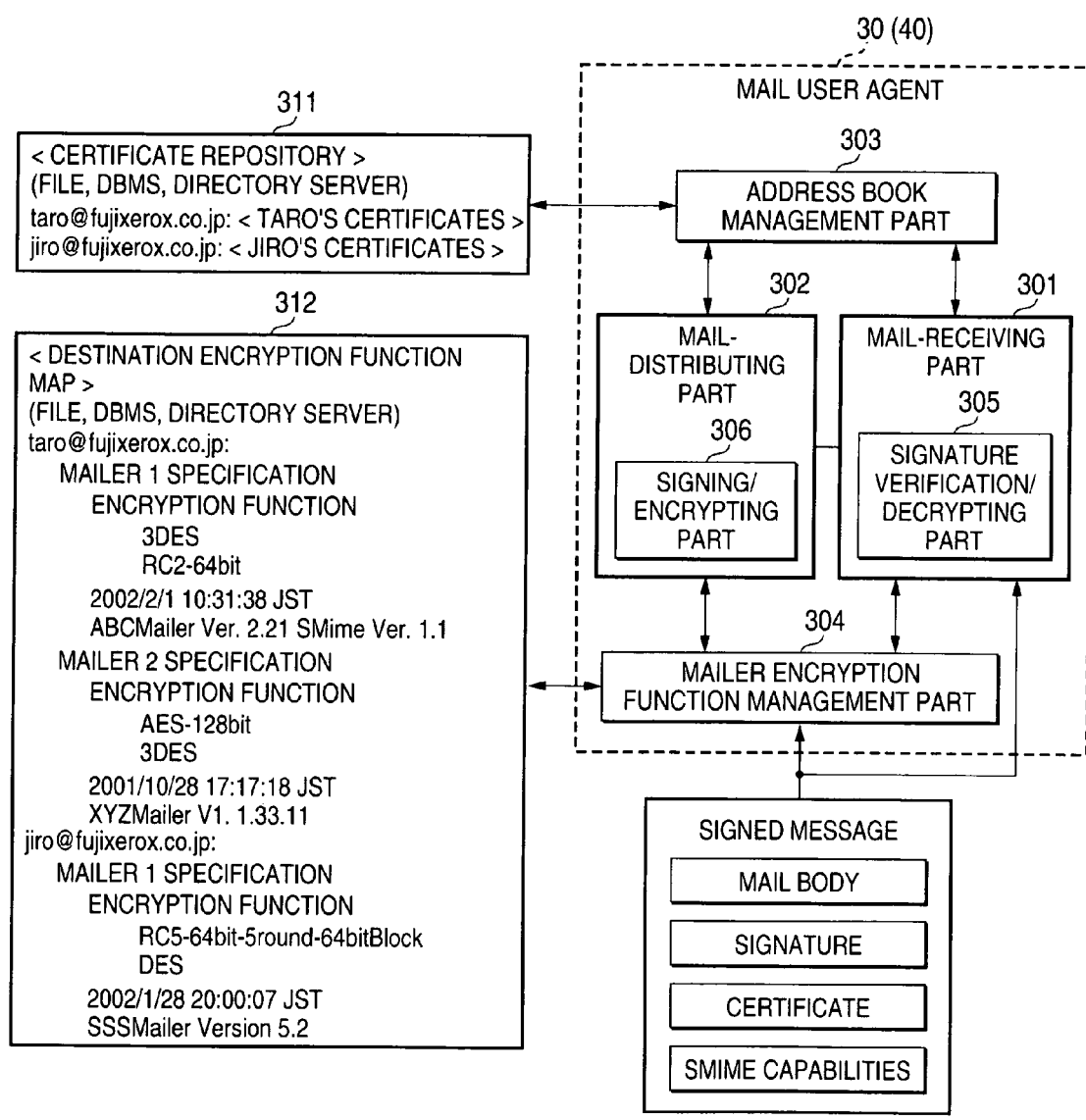
FIG. 8 is a view illustrating another example of the invention.

The present invention is not limited to the preferred embodiment described above, and various changes are possible within the scope of the invention. For example, although the example of a mailing list server was used above, the invention can also be applied to a mail user agent device. FIG. 8 shows an example of a mail user agent device, and in this example also it is possible to manage encryption methods and send mail encrypted by an encryption method compatible with the destination mail address in the same way as in the preferred embodiment described above. In FIG. 8, parts corresponding to parts in FIG. 2 have been assigned corresponding reference numbers. In FIG. 8, a mail-receiving part 301 takes mail from a predetermined mail server, and with a signature verification/decrypting part 305 thereof performs signature verification and decrypting. A signing/encrypting part 306 performs signing and encrypting of mail and requests distribution from a predetermined mail server. An address book management part 303 performs registration of destination addresses and so on. A mailer encryption function management part 304 acquires SMIME capabilities from signed mails received and stores and manages them in a destination encryption function map 312, and determines encryption methods for outgoing mail on the basis of this. Certificates are acquired using a certificate repository 311.

As described above, with this invention it is possible to encrypt mail using an encryption method compatible with the destination of the mail transmission. In particular, the invention is highly suitable for S/MIME mailing list services.

What is claimed is:

1. A mailing list server comprising:
    a receiving section for receiving a mail including a description of an attribute of an encryption method of the mail user agent used by the sender of the mail;
    an encryption method attribute storing section for on the basis of the encryption method attribute description in the received mail, storing the encryption method attribute in association with the origin mail address of the received mail;
    an encryption method determining section for using an encryption method attribute stored in association with the origin mail address in the encryption method attribute storing section to determine an encryption method to be used when sending a mail to the origin mail address;
    an encrypting section for encrypting the mail to be sent to the origin mail address on the basis of the determined encryption method; and
    a sending section for sending the mail encrypted by the encrypting section to the origin mail address.

2. The mailing list server according to claim 1, wherein the encryption method attribute storing section stores the date/time of transmission of the received mail together with the encryption method attribute it stores in association with the origin mail address.

3. The mailing list server according to claim 1, wherein a value received as an SMIMECapabilities parameter included in a signed mail is used as the encryption method attribute description.

4. The mailing list server according to claim 1, wherein an X-mailer mail header is used as the encryption method attribute description.

5. The mailing list server according to claim 1, wherein the encryption method attribute is a symmetrical encryption attribute.

6. The mailing list server according to claim 1, wherein
when a plurality of encryption method attributes are registered in association with the same origin mail address,
the encryption method determining section determines as the encryption method for mail encryption the highest-level encryption method among the encryption methods supported by all of the encryption method attributes.

7. A transmission method of a mailing list server comprising:
- a receiving step of receiving a mail including a description of an attribute of an encryption method of the mail user agent used by the sender of the mail;
- an encryption method attribute storing step of on the basis of the encryption method attribute description in the received mail, storing the encryption method attribute in association with the origin mail address of the received mail;
- an encryption method determining step of using an encryption method attribute stored in association with the origin mail address in the encryption method attribute storing step to determine an attribute of an encryption method to be used when sending a mail to the origin mail address;
- an encrypting step of encrypting the mail to be sent to the origin mail address on the basis of the determined encryption method attribute; and
- a sending step of sending the mail encrypted in the encrypting step to the origin mail address.

8. A computer readable storage medium that stores program instructions executable by a computer to implement a mailing list server, the instructions causing the computer to perform a method comprising:
- a receiving step of receiving a mail including a description of an attribute of an encryption method of the mail user agent used by the sender of the mail;
- an encryption method attribute storing step of on the basis of the encryption method attribute description in the received mail, storing the encryption method attribute in association with the origin mail address of the received mail;
- an encryption method determining step of using an encryption method attribute stored in association with the origin mail address in the encryption method attribute storing step to determine an attribute of an encryption method to be used when sending a mail to the origin mail address;
- an encrypting step of encrypting the mail to be sent to the origin mail address on the basis of the determined encryption method attribute; and
- a sending step of sending the mail encrypted in the encrypting step to the origin mail address.

9. A mail user agent device comprising:
- a receiving section for receiving a mail including a description of an attribute of an encryption method of the mail user agent used by the sender of the mail;
- an encryption method attribute storing section for on the basis of the encryption method attribute description in the received mail, storing the encryption method attribute in association with the origin mail address of the received mail;
- an encryption method determining section for using an encryption method attribute stored in association with the origin mail address in the encryption method attribute storing section to determine an attribute of an encryption method to be used when sending a mail to the origin mail address;
- an encrypting section for encrypting the mail to be sent to the origin mail address on the basis of the determined encryption method attribute; and
- a sending section for sending the mail encrypted by the encrypting section to the origin mail address,
wherein when a plurality of encryption method attributes are registered in association with the same origin mail address, the encryption method determining section determines as the encryption method for mail encryption the highest-level encryption method among the encryption methods supported by all of the encryption method attributes.

10. A mail transmission method for a mail user agent device comprising:
- a receiving step of receiving a mail including a description of an attribute of an encryption method of the mail user agent used by the sender of the mail;
- an encryption method attribute storing step of on the basis of the encryption method attribute description in the received mail, storing the encryption method attribute in association with the origin mail address of the received mail;
- an encryption method determining step of using an encryption method attribute stored in association with the origin mail address in the encryption method attribute storing step to determine an attribute of an encryption method to be used when sending a mail to the origin mail address;
- an encrypting step of encrypting the mail to be sent to the origin mail address on the basis of the determined encryption method attribute; and
- a sending step of sending the mail encrypted in the encrypting step to the origin mail address,
wherein when a plurality of encryption method attributes are registered in association with the same origin mail address, in the encryption method determining step the highest-level encryption method among the encryption methods supported by all of the encryption method attributes is determined as the encryption method for mail encryption.

11. A computer readable storage medium that stores program instructions executable by a computer to implement a mail user agent device, the instructions causing the computer to perform a method comprising:
- a receiving step of receiving a mail including a description of an attribute of an encryption method of the mail user agent used by the sender of the mail;
- an encryption method attribute storing step of, on the basis of the encryption method attribute description in the received mail, storing the encryption method attribute in association with the origin mail address of the received mail;
- an encryption method determining step of using an encryption method attribute stored in association with the origin mail address in the encryption method attribute storing step to determine an attribute of an encryption method to be used when sending a mail to the origin mail address;
- an encrypting step of encrypting the mail to be sent to the origin mail address on the basis of the determined encryption method attribute; and
- a sending step of sending the mail encrypted in the encrypting step to the origin mail address, wherein when a plurality of encryption method attributes are registered in association with the same origin mail address, in the encryption method determining step the highest-level encryption method among the encryption methods supported by all of the encryption method attributes is determined as the encryption method for mail encryption.

12. A mail encryption method specifying method comprising the steps of:
    collecting a plurality of types of information indicating encryption methods applied to encrypted mails sent from an origin mail address of a sender and storing the collected information in association with the origin mail address of the sender;
    generating from the collected information indicating encryption methods a group of encryption methods which the sender associated with the origin mail address can decrypt; and
    specifying an encryption method to be used to encrypt mail to be sent to the sender from said group of encryption methods which the sender can decrypt.

13. The mail encryption method specifying method according to claim 12, wherein
    the specifying of the encryption method from the group of encryption methods which the sender can decrypt is carried out with strength of encryption as a reference.

14. A mailing list server comprising:
    a collecting section for collecting a plurality of types of information indicating encryption methods applied to encrypted mails sent from an origin mail address of a sender and storing the collected information in association with the origin mail address of the sender;
    a generating section for generating from the collected information indicating encryption methods a group of encryption methods which the sender associated with the origin mail address can decrypt; and
    a specifying section for specifying an encryption method to be used to encrypt mail to be sent to the sender from said group of encryption methods which the sender can decrypt.

15. A computer readable storage medium that stores program instructions executable by a computer to implement a mailing list server, the instructions causing the computer to perform a method comprising:
    collecting a plurality of types of information indicating encryption methods applied to encrypted mails sent from an origin mail address of a sender and storing the collected information in association with the origin mail address of the sender;
    generating from the collected information indicating encryption methods a group of encryption methods which the sender associated with the origin mail address can decrypt; and
    specifying an encryption method to be used to encrypt mail to be sent to the sender from said group of encryption methods which the sender can decrypt.

16. The mailing list server according to claim 14, wherein
    the specifying of the encryption method from the group of encryption methods which the sender can decrypt is carried out with strength of encryption as a reference.

17. A mail user agent device comprising:
    a collecting section for collecting a plurality of types of information indicating encryption methods applied to encrypted mails sent from an origin mail address of a sender and storing the collected information in association with the origin mail address of the sender;
    a generating section for generating from the collected information indicating encryption methods a group of encryption methods which the sender associated with the origin mail address can decrypt; and
    a specifying section for specifying an encryption method to be used to encrypt mail to be sent to the sender from said group of encryption methods which the sender can decrypt.

18. A computer readable storage medium that stores program instructions executable by a computer to implement a mail user agent device, the instructions causing the computer to perform a method comprising:
    collecting a plurality of types of information indicating encryption methods applied to encrypted mails sent from an origin mail address of a sender and storing the collected information in association with the origin mail address of the sender;
    generating from the collected information indicating encryption methods a group of encryption methods which the sender associated with the origin mail address can decrypt; and
    specifying an encryption method to be used to encrypt mail to be sent to the sender from said group of encryption methods which the sender can decrypt.

19. The mail user agent device according to claim 17, wherein
    the specifying of the encryption method from the group of encryption methods which the sender can decrypt is carried out with strength of encryption as a reference.

* * * * *